(12) United States Patent
Kunitake et al.

(10) Patent No.: US 8,470,496 B2
(45) Date of Patent: Jun. 25, 2013

(54) ION CONDUCTIVE MATERIAL, CONDUCTIVE FILM FOR FUEL CELL, FILM ELECTRODE BONDED BODY AND FUEL CELL

(75) Inventors: Toyoki Kunitake, Wako (JP); Yoshitaka Aoki, Wako (JP); Emi Muto, Wako (JP)

(73) Assignee: Riken, Wako-Shi (JP)

( * ) Notice: Subject to any disclaimer, the term of this patent is extended or adjusted under 35 U.S.C. 154(b) by 400 days.

(21) Appl. No.: 12/282,630

(22) PCT Filed: Feb. 20, 2007

(86) PCT No.: PCT/JP2007/053027
§ 371 (c)(1),
(2), (4) Date: Sep. 11, 2008

(87) PCT Pub. No.: WO2007/105422
PCT Pub. Date: Sep. 20, 2007

(65) Prior Publication Data
US 2009/0098438 A1    Apr. 16, 2009

(30) Foreign Application Priority Data
Mar. 14, 2006   (JP) .................................. 2006-069362

(51) Int. Cl.
*H01M 8/10* (2006.01)
*H01M 8/12* (2006.01)
*C03C 3/06* (2006.01)
*C03C 3/076* (2006.01)

(52) U.S. Cl.
USPC ................ 429/495; 429/491; 501/54; 501/55

(58) Field of Classification Search
USPC ............ 429/400–535; 423/326, 327.1, 328.1, 423/328.2, 328.3, 700; 501/54, 55
See application file for complete search history.

(56) References Cited

U.S. PATENT DOCUMENTS

| | | | |
|---|---|---|---|
| 4,985,315 | A | 1/1991 | Lemoine |
| 2003/0232250 | A1 | 12/2003 | Nogami et al. |

FOREIGN PATENT DOCUMENTS

| | | |
|---|---|---|
| JP | 2-172842 A | 7/1990 |
| JP | 2000-260442 A | 9/2000 |
| JP | 2001-143723 A | 5/2001 |
| JP | 2004-30928 A | 1/2004 |
| JP | 2004-213982 A | 7/2004 |
| JP | 2004-256327 A | 9/2004 |
| JP | 2005-197062 A | 7/2005 |
| JP | 2006-107799 A | 4/2006 |
| JP | 2006-176342 A | 7/2006 |
| WO | WO2006/014403 A2 * | 2/2006 |

OTHER PUBLICATIONS

Lin, Y. S. "Microporous and dense inorganic membranes: current status and prospective". Separation and Purification Tech 25 (2001): 39-55.*

Bernay, et al., "Prospects of different fuel cell technologies for vehicle applications," Journal of Power Sources, vol. 108, pp. 139-152 (2002).

(Continued)

*Primary Examiner* — Basia Ridley
*Assistant Examiner* — James Lee
(74) *Attorney, Agent, or Firm* — Birch, Stewart, Kolasch & Birch, LLP

(57) ABSTRACT

A novel ion conductive material is provided. The ion conductive material composed of an amorphous material is employed.

13 Claims, 16 Drawing Sheets

OTHER PUBLICATIONS

Ito, et al., "New intermediate temperature fuel cell with ultra-thin proton conductor electrolyte," Journal of Power Sources, vol. 152, pp. 200-203 (2005).

Iwahara, et al., "Protonic Conduction in Oxides at Elevated Temperatures and Their Possible Applications," Electrochemistry, vol. 68, pp. 154-161 (2000).

Mitsugi, et al., "As-Deposited $(La_{1-x}Sr_x)(Ga_{1-y-z}Mg_yCo_z)O_{3-(x+y+z)/2}$ crystallized Thin Films Prepared by Pulsed Laser Depostion for Application to Solid Oxide Fuel Cell Electrolyte," Japanese journal of Applied Physics, vol. 43, pp. 299-302 (2004).

Steele, et al., "Materials for fuel-cell technologies," Nature, vol. 414, pp. 345-352 (2001).

Yan, et al., "High-Power SOFC Using $La_{0.9}Sr_{0.1}Ga_{0.8}Mg_{0.2}O_{3-\delta}$/$Ce_{0.8}Sm_{0.2}O_{2-\delta}$ Composite Film," Electrochemical and Solid-State Letters, vol. 8 (8), pp. A389-A391 (2005).

* cited by examiner (a)

(b)

ION CONDUCTIVE MATERIAL, CONDUCTIVE FILM FOR FUEL CELL, FILM ELECTRODE BONDED BODY AND FUEL CELL

This application is the national stage of International Application PCT/JP2007/053027, filed in Japan on Feb. 20, 2007. The International Application PCT/JP2007/053027 in turn claims priority under 35 USC § 119(a)-(d) upon Japanese application 2006-069362, filed on Mar. 14, 2006.

TECHNICAL FIELD

The present invention relates to ion conductive materials having oxide ion conductivity and/or proton conductivity, in particular, to an ion conductive material which is useful as a conductive film for fuel cell.

BACKGROUND ART

An oxide ion conductive film used as a solid electrolyte film for fuel cell is required to allow transport of an oxide ion but does not allow electron conduction and gas permeation. Therefore, the oxide ion conductive film tends to become thicker. On the other hand, a thin oxide ion conductive film is preferable in the view of facilitating ion transportability.

A known conventional oxide ion conductive film with the highest conductivity is a sintered polycrystalline ceramic ($Gd_{0.1}Ce_{0.90}O_{2-\delta}$, $La_{0.8}Sr_{0.2}Ga_{0.8}Mg_{0.2}O_{3-\delta}$) (non-patent documents 1 through 3). In the oxide ion conductive films in these documents, it is necessary to be operable at 500° C. or higher even though the oxide ion conductive films are such a thin film of, e.g. 10 μm in thickness, otherwise the oxide ion conductive films cannot attain $R_{as} < 0.2$ (Ωcm$^2$), which should be satisfied for an oxide ion conductive film to be practically used in fuel cells. Further, to reduce the operation temperature, it is necessary to make the oxide ion conductive film thinner. A sintered polycrystalline ceramic having a thickness of 10 μm or less causes problems in workability and mechanical strength because gas molecules are easy to disperse at particle boundary. As a result, the sintered polycrystalline ceramic does not work as an oxide ion conductive film in the end.

Namely, no oxide ion conductive film exists which works as a conductive film for fuel cell at less than 500° C.

Moreover, high temperature, 1000° C. or more, is required to manufacture a conventional oxide ion conductive film which is made of ceramic. This causes a problem of performance degradation by a reaction with other constituent materials for fuel cell.

On the other hand, a proton conductive film is also used as a solid electrolyte film for fuel cell. However, most of them are organic proton conductive films typified by Nafion (registered trademark) and one made of inorganic materials is only reported as a kind of ceramic (non-patent document 4). An organic proton conductivity film, in particular, is not adequate to work at high temperature. In consideration of catalyst cost and utilization in cars and the like, it is preferable to work at higher temperature (non-patent documents 5 and 6).

It is expected to expand the ranges of workable temperature and adaptability by obtaining a conductive film which has both characteristics of oxide ion conductivity and proton conductivity. In addition, it is expected to improve the efficiency of a catalyst when the film is used in fuel cell.

Non-patent document 1: Nature 414: 345-352 (2001)
Non-patent document 2: Electrochem. Solid State Lett. 8: A389-391 (2005)
Non-patent document 3: Jpn. J. Appl. Phys. 43: 299-302 (2004)
Non-patent document 4: Electrochem. 68: 154-161 (2000)
Non-patent document 5: J. Power Sources 108: 139-152 (2002)
Non-patent document 6: J. Power Sources 152: 200-203 (2005)

DISCLOSURE OF INVENTION

The present invention is made in view of the forgoing problem. An object of the present invention is to provide an ion conductive material which is capable of providing a conductive film working in a wide temperature range from low temperature to high temperature and has a low area specific resistivity, in particular, to provide an ion conductive material which has both characteristics of oxide ion conductivity and proton conductivity.

Means to Solve the Problem, and Effect

As a result of diligent studies, the inventors of the present invention found that it is possible to attain the object by using an amorphous material surprisingly. Specifically, the object is attained by the following means.

(1) An ion conductive material made of an amorphous material, the ion conductive material having an oxide ion conductivity and/or proton conductivity.

(2) The ion conductive material as set forth in (1), wherein the amorphous material is an amorphous material prepared by doping a metallic oxide with a cation, the metallic oxide being selected from the group consisting of $SiO_2$, $TiO_2$, $ZrO_2$, $Al_2O_3$, and $CeO_2$, and the cation having a coordination number 5 or more, and being different from a metallic ion that the metallic oxide has.

(3) The ion conductive material as set forth in (1), wherein the amorphous material is an amorphous material prepared by doping a metallic oxide with a cation, the metallic oxide being selected from the group consisting of $SiO_2$, $TiO_2$, and $ZrO_2$, and the cation having a coordination number 5 or more.

(4) The ion conductive material as set forth in (2) or (3), wherein the cation is a cation with a coordination number 6 or more.

(5) The ion conductive material as set forth in any one of (2) through (4), wherein the cation is a metal ion.

(6) The ion conductive material as set forth in any one of (2) through (5), wherein the cation is at least one selected from the group consisting of rare-earth metal ions, Al ion, Zr ion, Nb ion, Hf ion, Ta ion, and first transition metal ions.

(7) The ion conductive material as set forth in any one of (2) through (5), wherein the cation is at least one selected from the group consisting of Ce ion, Al ion, Ti ion, Zr ion, Nb ion, Y ion, La ion, Hf ion, and Ta ion.

(8) The ion conductive material as set forth in any one of (1) through (7) having a film shape.

(9) The ion conductive material as set forth in (8), wherein the film is in a range of 0.005 μm to 1.0 μm in thickness.

(10) The ion conductive material as set forth in (8) or (9) shows $1 \times 10^{-6}$ S·cm$^{-1}$ or more ion conductivity at operation temperature 0° C. to 800° C.

(11) The ion conductive material as set forth in (8) or (9) having $1 \times 10^{-6}$ S·cm$^{-1}$ or more ion conductivity at operation temperature less than 500° C.

(12) The ion conductive material as set forth in (8) or (9) having $5\times10^{-5}$ S·cm$^{-1}$ or more ion conductivity at operation temperature 400° C. or less.

(13) The ion conductive material as set forth in any one of (8) through (12) having 0.2 Ωcm$^2$ or less area specific resistivity at operation temperature 0° C. through 800° C.

(14) The ion conductive material as set forth in any one of (1) through (13), wherein the ion conductivity is proton conductivity.

(15) The ion conductive material as set forth in any one of (1) through (13), wherein the ion conductivity is oxide ion conductivity.

(16) The ion conductive material as set forth in any one of (1) through (13), wherein the ion conductivity is mixed conductivity of proton conductivity and oxide ion conductivity.

(17) A conductive film for a fuel cell including an ion conductive material as set forth in any one of (1) through (16).

(18) A membrane electrode assembly including an ion conductive material as set forth in any one of (1) through (16).

(19) A fuel cell including a membrane electrode assembly as set forth in (18).

Effect of the Invention

The present invention allows providing an ion conductive material and an oxide ion conductive material which are capable of forming a conductive film which works in a wide temperature range from low temperature to high temperature and has a low area specific resistivity. In particular, the present invention is further possible to provide a proton-oxide ion mixed conductive material.

EXPLANATION OF REFERENCE NUMERALS

Figure 1:
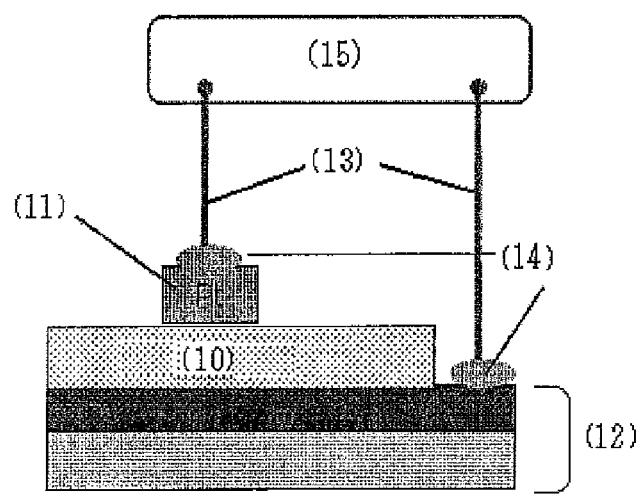
FIG. 1 is a schematic view of a device used for AC impedance measurement in Example 1.

10 M5Si95 film
11 Pt button electrode
12 ITO substrate
13 gold wire
14 Pt-paste
15 SOLARTRON 1250
61 gas chamber
62 gas chamber
63 porous substrate
64 M5Si95 film
65 low-oxygen partial pressure $N_2/O_2$ mixture gas
66 high-oxygen partial pressure $N_2/O_2$ mixture gas

BEST MODE FOR CARRYING OUT THE INVENTION

The following description deals with a detailed explanation of the present invention. In this specification, "value A to value B" means that the value A and the value B are included as the lower limit and the upper limit, respectively. In this specification, "oxide ion conductive material" means a solid-state material which allows oxide ion ($O^{2-}$) to pass therethrough by an external electric filed or a chemical potential and does not allow electrons and other ions to pass therethrough, and molecular oxygen to penetrate therethrough. It is preferable that a solid-state material which is capable of generating 1 Acm$^2$ or more oxide ion current density when 1 V electric filed is applied. "Proton conductive material" is a sold-state material which allows proton ($H^+$) to pass therethrough by an external electric filed or a chemical potential and does not allow electrons and other ions to pass therethrough, and molecular hydrogen to penetrate therethrough. "Proton-oxide ion mixed conductivity material" allows proton ($H^+$) and oxide ion ($O^{2-}$) to pass therethrough by an external electric filed or a chemical potential and does not allow electrons and other ions to pass therethrough, and molecular gas to penetrate therethrough.

The ion conductive material of the present invention is formed from an amorphous material. In this specification, "ion conductive material formed from an amorphous material" has two meanings, one is that the ion conductive material is composed of an amorphous material only; and the other is that the ion conductive material includes an amorphous material and other materials, e.g. impurities got into the ion conductive material in the manufacturing process, within the scope of the present invention. Further, the ion conductive material in the present invention may include a part of crystalline structure of an ion conductive material within the scope of the present invention. The amount of the crystalline structure is preferably 20% or less of the volume of the ion conductive material, and 10% or less is more preferable.

As for an amorphous material, an inorganic material is preferable. It is more preferable that one metallic oxide selected from the group consisting of $SiO_2$, $TiO_2$, $ZrO_2$, $Al_2O_3$, and $CeO_2$ which is doped with cation with a coordination number of 5 or more. Among them, $SiO_2$ doped with cation with a coordination number 5 or more is further preferable. Note that cation is not a same type of metallic ion that the metallic oxide has. In this specification, diffusion of oxygen in pure amorphous silica $SiO_2$ ($\alpha$-$SiO_2$) is not a diffusion of oxide ion but a diffusion of oxygen in atomic state. This is because that Si—O binding has a strong covalent bonding and dissociative reaction between $Si^{4+}$ and $O^{2-}$ is less likely to happen. Therefore, $\alpha$-$SiO_2$ is a substance which hardly conducts $O^{2-}$ ions. This information is written in Journal of applied physics 98, 013579 (2005), Journal of applied physics 98, 013528 (2005), Journal of applied physics 98, 013529 (2005), and so on. Surprisingly, however, a material having oxide ion conductivity was successfully produced by using a metallic oxide, e.g. silica, as a base component and by doping the base component with a specific cation. More surprisingly, inventors of the present invention found that the amorphous material thus obtained has proton conductivity as well.

In this specification, dope means that metal cation atoms with a coordination number of 5 or more exist inside metallic oxides such as $SiO_2$, $TiO_2$, $ZrO_2$, $Al_2O_3$, $CeO_2$, and the like. These metallic oxides may be used solely or two or more of them may be used in combination within the scope of the present invention. In an ion conductive material of the present invention, oxygen in ionic state may be included apart from the compositions regarding $SiO_2$, $TiO_2$, $ZrO_2$, $Al_2O_3$, and $CeO_2$. Within the scope of the present invention, the ion conductive material may contain such an oxide ion, or the like. The cation with a coordination number of 5 or more is preferably the one with a coordination number of 6 or more and is more preferably the one with a coordination number of 6 to 12. Specifically, the cation used in the present invention is preferably a metal ion. Among metal ions, rare-earth metal ion, Al ion, Zr ion, Nb ion, Hf ion, Ta ion, or first transition metal ion is more preferable; and Ce ion, Al ion, Ti ion, Zr ion, Nb ion, Y ion, La ion, Hf ion, or Ta ion is far more preferable; and Hf ion, Al ion, or Zr ion is particularly preferable. Also, the cation may be included solely or two or more in combination.

Aluminosilicate shows strong bronsted acidity because it contains many protons due to the negative charge in —O—$Si^{4+}$—O—$Al^{3+}$-$\Theta$O— binding. Therefore, it is known that zeolite as a crystalline aluminosilicate compound shows proton conductivity. However, zeolite allows $H_2$ and $O_2$ gas to pass through easily because of its channel construction. Also, zeolite is a material of sintering resistance. Therefore, it was extremely difficult to produce a thin film made of zeolite having high consistency. In the present invention, however, inventors of the present invention found that amorphous materials having an aluminosilicate skeleton can be used as a material having excellent proton conductivity.

In the amorphous material used in the present invention, a ratio of metal inside metallic oxide (i.e. silicon):cation (mole ratio) is preferably 99.9 to 70:0.1 to 30 is preferable, and more preferably 95 to 75:5 to 25, and particularly preferably 90 to 80:10 to 20.

A manufacturing method of the ion conductive material of the present invention is not specifically limited and a known method can be used. The following description deals with how to form a film shaped ion conductive material (a conductive film) with use of an amorphous material in which silica is doped with cation as an example. However, other metal oxides may be used in a like manner. First, one method is that a solution including silica precursor and cationic component (called basic solution hereinafter) is prepared. Then the basic solution is applied to a substrate so as to make a thin film of the basic solution and the basic solution in the thin film form is hydrolyzed and calcinated. For applying the basic solution to the substrate, known methods such as a spin coating method can be used. The spin coating method is preferable because it can reduce the number of coating and control the film thickness. Further, in the present invention, a layered product having a plurality of thin layers is preferable. This structure allows the thin film to be more uniform and to have excellent conductivity. It is preferable that a density of the cationic material in the basic solution ranges from 2 mM to 100 mM. Also, a ratio of silicon:cation is determined from a ratio of an ion conductive material to be obtained. The hydrolysis is not specifically limited as long as a silica precursor is converted to silica which is doped with cation. For example, it is preferable that the basic solution adsorbed to a solid is steam treated, water treated, or heat-treated in damp. As for the water in this process, ion-exchange water is preferably used in order to form a thin film from high-purity basic solution and to prevent a contamination by impurities. After the hydrolysis, a surface of the substrate may be dried by gas for drying such as nitrogen gas as required. Further, it may be possible to reduce the processing time to a large extent by using a catalyst such as acid and base. The calcination is preferably performed at 100° C. to 500° C. for 10 seconds to 24 hours. In a manufacturing process of the present invention, all the procedures are performed at 500° C. or less, which is preferable in preventing deteriorations by a reaction with other materials for fuel cell.

In this specification, silica precursor means that substances which are converted to silica by hydrolysis. As for silica precursor, specifically, alkoxysilane, silane halides, liquid glass, and silane isocyanate are preferable, and alkoxy silane is more preferable. Among alkoxy silanes, tetraalkoxy silane is preferable, and tetramethoxysilane, tetraethoxy silane, tetrapropoxy silane, tetrabutoxy silane, tributoxy silanol, methyltriethoxysilane are more preferable. In a case of using $TiO_2$, $ZrO_2$, $Al_2O_3$, or $CeO_2$, it is preferable to use halogen compound or alkoxy compound which includes one metal selected from Ti, Zr, Al, or Ce.

Examples of cationic materials encompass: metal alkoxides, isocyanete metal compounds, halogen compounds, cheated complexes, arganometallic complexes, and any reagents which can generate metal oxide by hydrolysis. As for metal alkoxide, for example, the one represented as $M(OR)_x$ is preferable. M is preferably a rare-earth metal atom such as Al, Zr, Nb, Hf, Ta; or a first transition metal ion and is more preferably Ce, Al, Ti, Zr, Nb, Y, La, Hf, or Ta. R is a group including alkyl group that is preferably a C1-C7 alkyl group, an alkyl carbonyl group, an alkyl keton group, or an alkyl diketon group. n is preferably an integral number from 1 to 6. Examples of $M(OR)_x$ encompass: $Ce(OC_2H_4OCH_3)_3$, $Hf(OC_4H_9)_4$, $Ta(OC_2H_5)_5$, $Zr(OC_4H_9)_4$, $Al(OCH(CH_3)_2)_3$, $La(OC_2H_4OCH_3)_3$, $Nb(OC_2H_5)_5$, $TiO(C_4H_9)_4$, and the like. Examples of metal halide compounds encompass: $CeCl_3$, $ZrCl_4$, $HfCl_4$, $LaCl_3$, $AlCl_3$, and $TaCl_5$, and the like. Specifically, in the present invention, it is preferable to adjust the mole ratio of M(OR)n:silica precursor ranging 1 to 50:99 to 50.

The ion conductive material of the present invention can be used as a film, for example, 0.005 μm to 1.0 μm in thickness. Further, the film can be 100 nm or less in thickness. In particular, the film can be 10 nm or less in thickness. Moreover, the ion conductive material in the present invention can maintain enough strength despite of its thin thickness of 100 nm or less. Namely, the ion conductive material of the present invention is a self-supporting material. A conventional electrolyte film made from crystalline ceramic is usually made of crystal particles several tens nm or more. Therefore, it is impossible to have a thickness of 5 μm or less. The present invention is significant in view of solving the forgoing problem.

An ion conductivity of the ion conductive material of the present invention is preferably $1 \times 10^{-6}$ S·cm$^{-1}$ or more, and is more preferably $5 \times 10^5$ S·cm$^{-1}$ or more, for example, at operation temperature 0° C. to 800° C., or preferably 100° C. to 400° C. Further, the oxide ion conductivity of the ion conductive material of the present invention is preferably $5 \times 10^{-6}$ S·cm$^{-1}$ or more, and is more preferably $5 \times 10^{-5}$ S·cm$^{-1}$ or more, for example, at operation temperature less than 500° C., and more preferably at operation temperature 400° C. or less. Moreover, even at operation temperature 350° C., $5 \times 10^{-5}$ S·cm$^{-1}$ or more is preferable, and $1 \times 10^{-4}$ S·cm$^{-1}$ or more is more preferable. On the other hand, the proton conductivity of the ion conductive material of the present invention is preferably $1 \times 10^{-6}$ S·cm$^{-1}$ or more, and is more preferably $5 \times 10^{-5}$ S·cm$^{-1}$ or more, for example, at operation temperature 0° C. to 800° C., or more preferably 100° C. to 400° C.

Further, an area specific resistivity of the ion conductive material of the present invention can be 10 Ωcm$^2$ or less; further it can be 1 Ωcm$^2$ or less; and in particular, it can be 0.5 Ωcm$^2$ or less. It is preferable that the area specific resistivity is 0.2 Ωcm$^2$ or less at operation temperature 0° C. to 800° C., more preferably at 100° C. to 400° C. Such a low area specific resistivity increases ion transport efficiency. This allows, for example, improving performance of fuel cell as an advantage. The ion conductive material which is highly practical has not been obtained before.

The ion conductive material of the present invention has at least one of the characteristics of oxide ion conductivity and proton conductivity and is more preferably a proton-oxide ion mixed conductive material.

The ion conductive material of the present invention, as described above, can be a film shaped (may be called conductive film hereinafter). The conductive film can be used as an electrolyte film for a solid fuel cell. The solid fuel cell includes a plurality of single cells including an assembly of an ion conductive film and a pair of electrodes (anode and cathode), sandwiched by collectors, each of which is connected to a conductive separator (bipolar plate) for separating each of the polar spaces and for supplying gas. A structure of the solid fuel cell, a manufacturing method of a film electrode assembly, a structure of an anode and a cathode, and materials are not specifically limited and known structures, methods, and materials can be used, for example, written in "Solid Oxide Fuel Cell: Development of SOFC" (published by CMC Publishing Co. Ltd.), Section 7 in "Fuel Cell Technique and Practical Use" (published by Techno System Co. Ltd.), and "Explanation: Fuel Cell System" (published by Ohmsha, Ltd.).

It is preferable that fuel cell is operated at high temperature because the high temperature increases catalytic activity and prevents overvoltage of the electrodes. On the other hand, the high temperature might cause a problem of degradation of electrodes, oxide ion conductive films, collectors, and separators due to a chemical reaction. The operation temperature of fuel cell including the conductive film of the present invention is not specifically limited within the scope of the present invention. It is very useful that the fuel cell can work sufficiently at a high temperature such as 800° C. or less, at middle temperature from 100° C. to 600° C., or, in particular, at low temperature 400° C. or less. Further, in temperature range from 200° C. to 400° C., for example, the conductive film can be a material having oxide ion conductivity and proton conductivity. This allows expanding choices of fuels and catalysts, thereby resulting in providing a versatile fuel cell as an advantage.

EXAMPLES

The following description deals with more specific explanation of the present invention with reference to some examples. Materials, using amount, ratio, process, and procedure may be altered within the scope of the present invention. Therefore, the present invention is not limited to the description of the following embodiments.

Example 1

A film in which precursor solution has an element ratio M/Si=5/95 (called M5Si95 film hereinafter, Table 1 show breakdown of M) was formed in the following method.

[Preparation of ITO Substrate]

A glass substrate (57635-2 made by Aldrich Corp.) coated with ITO electrode (ITO substrate) was ultrasonically cleaned with use of ethanol for five minutes. Then the surface of the substrate was irradiated with oxygen plasma by using an oxygen plasma etcher (FA-1 made by SAMCO, Inc.) (10 W, 10 Pa, 30 seconds) for hydrophilization.

[Preparation of M–Si Mixed Precursor Solution]

0.396 g tetraethoxysilane (TEOS made by Kanto Chemical Co. Inc., 99.9%) was added to 15 ml 1-propanol solution (1-ProOH), and 130 μl 0.1 mol/dm$^3$HCl solution was further added. The resultant was mixed at room temperature. Then metal alkoxides (M(OR)$_n$) in Table 1 was respectively added to be M/Si=5/95 (mole ratio) and was mixed for 30 minutes at 70° C. The mixture thus obtained was filtered to eliminate floating matters. The filtered solution was diluted with 1-ProOH to be 50 ml. As a result, M-Si mixed precursor solution in which element ratio M/Si=5/95 and the metallic element concentration [M+Si]=0.04 mol/cm$^3$ was obtained.

TABLE 1

| Metal alkoxides (M(OR)$_n$) | | |
|---|---|---|
| M | R | n |
| Ce | CH$_3$OCH$_2$CH$_2$— | 4 |
| Al | (CH$_3$)$_2$CH— | 3 |
| Ti | CH$_3$CH$_2$CH$_2$CH$_2$— | 4 |
| Zr | CH$_3$CH$_2$CH$_2$CH$_2$— | 4 |
| Ba | CH$_3$OCH$_2$CH$_2$— | 2 |
| La | CH$_3$OCH$_2$CH$_2$— | 3 |
| Hf | CH$_3$CH$_2$CH$_2$CH$_2$— | 4 |
| Ta | CH$_3$CH$_2$— | 5 |

[M5Si95 Film Production]

On the ITO substrate, 200 μl M–Si mixed precursor solution was dropped and was spin coated (3000 rpm, 20 seconds) and an extremely thin M–Si oxide gel film was obtained. The TTO substrate was immersed in water at 60° C. for hydrolysis of M–Si oxide gel. After taking out from the water, the ITO substrate was dried by an N$_2$ blow. This procedure from spin coating to drying was repeated for 10 times or more. After performing O$_2$ plasma treatment (10 W, 10 Pa, for 30 seconds), the ITO substrate was calcinated at 400° C. for 15 minutes. This process was repeated more than 3 times and M5Si95 film was obtained. Note that the last calcination (anneal) was performed at 400° C. for 1 hour.

[Measurement of Ion Conductivity by an AC Impedance Method]

Figure 2:
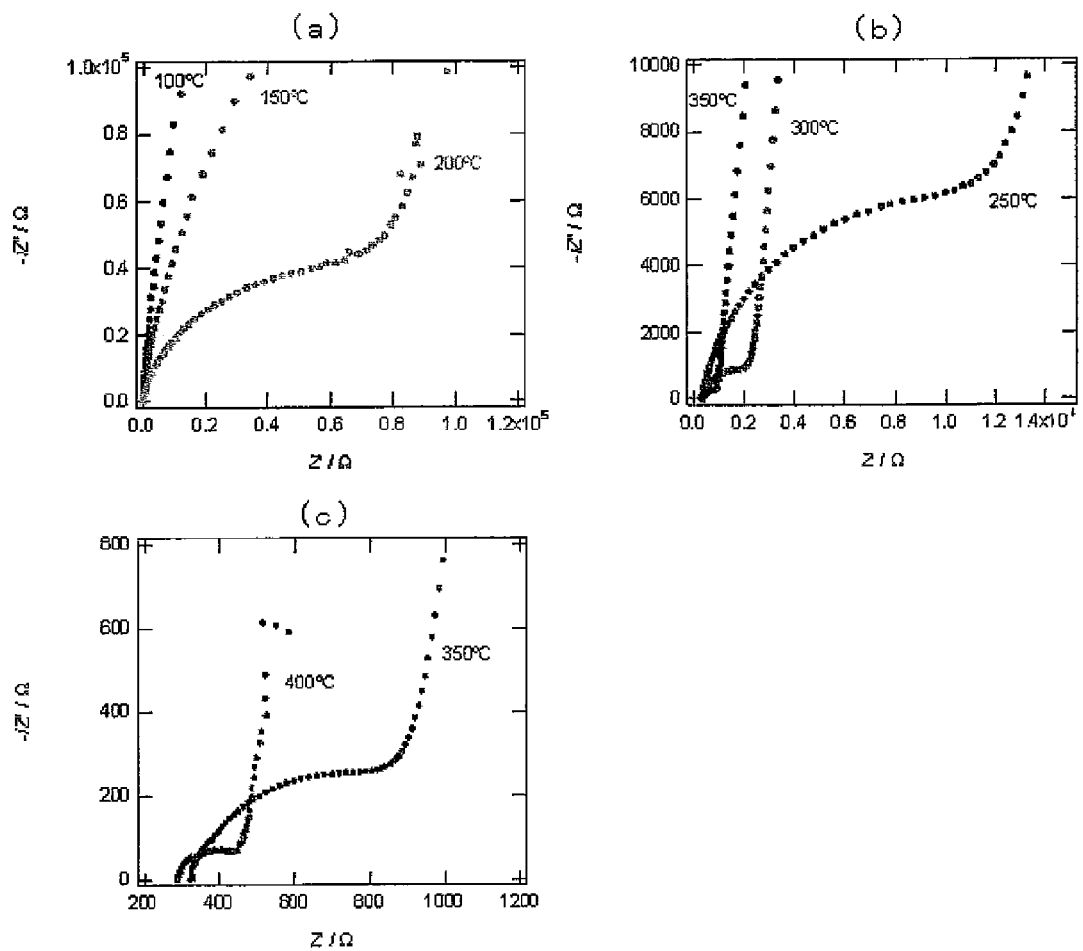
FIG. 2 is a graph showing that impedance Cole-Cole plot of Ce5Si95 film against the temperatures in Example 1.

Ion conductivity of the M5Si95 film thus obtained was measured by using an apparatus illustrated in FIG. 1 in a method of AC impedance. Specifically, Pt button electrode (11) (1 mm in diameter, 100 nm in thickness) was sputter-evaporated onto the M5Si95 film (10) provided on the ITO substrate (12). Then gold wires (0.05 mm in diameter) (13) were respectively glued to both electrodes with Pt-paste (14) as electric contacts. Ion conductivity was measured by using a SOLARTRON 1250 (15) (made by Solartron). Note that frequency range was from $10^7$ to 100 Hz and amplitude was 20 mV. The measurements were carried out in dry air (100 ml/min) at respective temperature 100° C., 150° C., 200° C., 250° C., 300° C., 350° C., and 400° C. FIG. 2(a) to (c) show measurement results of Ce5Si95 (Cole-Cole plot). In these figures, the horizontal axis indicates real number component of impedance Z' (Ω) (when current and voltage have 0 phase difference), and the vertical axis indicate imaginary number component of impedance −iZ" (Ω) (when current and voltage have π/2 phase difference). Also, data in FIG. 2(a) to (c) is a total impedance measured within a range of each of the frequencies (within $10^7$-10 Hz) shown Z' with respect to −iZ" as follows.

$$Z=(|Z'|^2+|Z''|^2)^{1/2}$$

Figure 3:
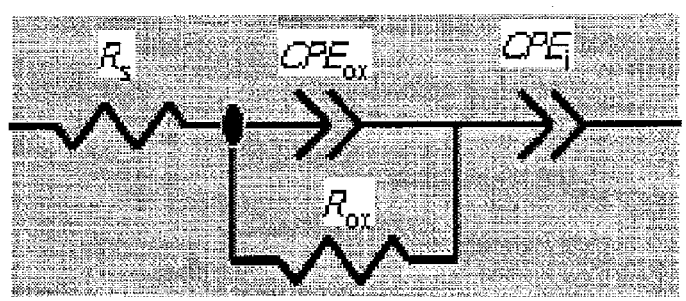
FIG. 3 is an equivalent circuit diagram model in accordance with electrolyte film/ion blocking electrode assembly.
Figure 4:
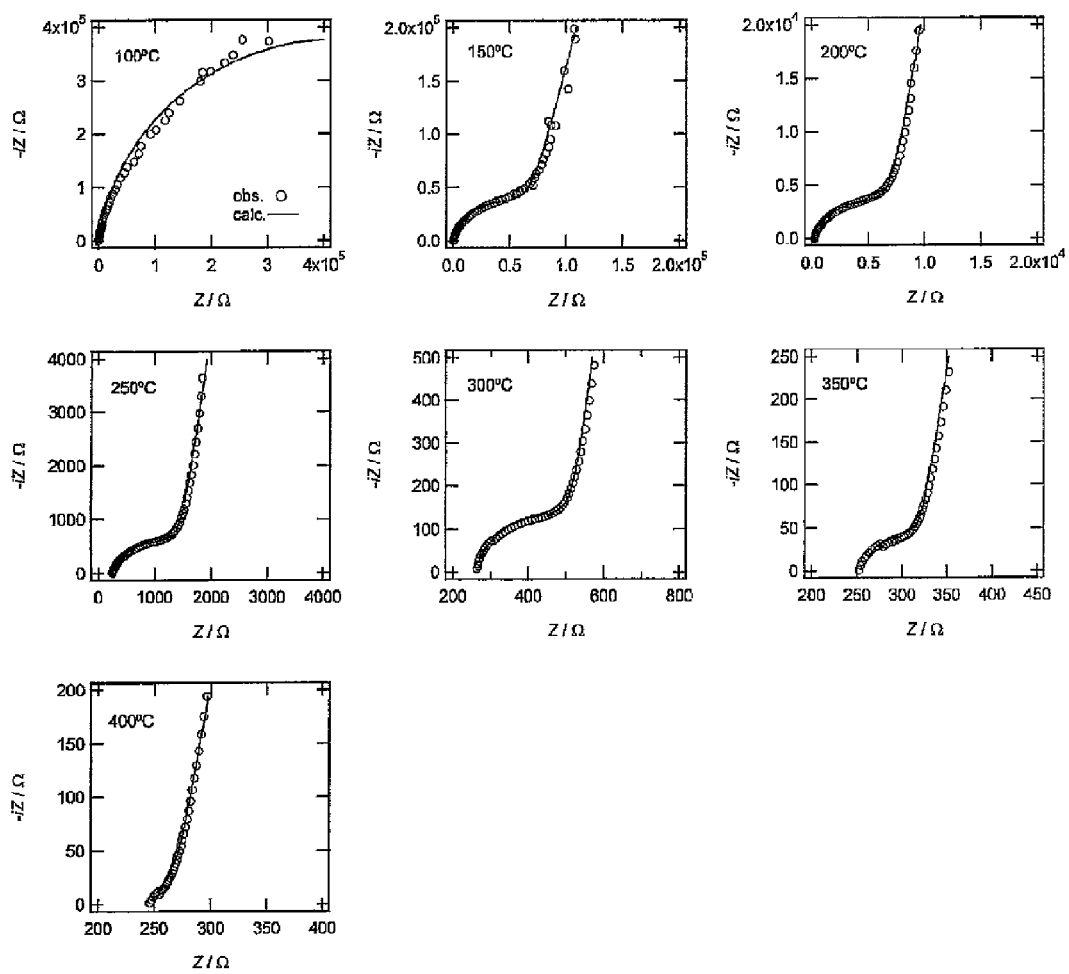
FIG. 4 shows fitting results of Ce5Si95 film in Example 1.

As it is clear from FIG. 2(a) to (c), each plot shows characteristic of semicircular arch on high frequency side and spiky shape on low frequency side. It is identified that the radius of the semicircular is getting shorter, as the temperature increase. In order to analyze the impedance measurement results, Pt/M5Si95/ITO substrate-stack was represented by an equivalent circuit. The M5Si95 film is considered to have a structure such that electrical resistance and electrostatic capacity (capacitance) are connected in parallel. Further, in the case where the M5Si95 film is an ion conductor, carrier of the M5Si95 film is an ion. However, carrier of the ITO substrate and the Pt electrodes is an electron (or hole). Therefore, electric charge migration does not occur between the M5Si95 and the ITO electrodes. As a result, electric charge is accumulated an interface of the M5Si95/ITO electrodes. Thus, the interface of the M5Si95/ITO electrodes is a parallel circuit having eternal electrical resistance and capacitance, i.e. a capacitor having large electrostatic capacitance. Therefore, an equivalent circuit model of Pt/M5Si95/ITO stack is like FIG. 3. In this figure, $R_s$ is electrical resistances relevant to measurement such as measurement system, leads, electrodes, and the like. $R_{ox}$ and $CPE_{ox}$ are electrical resistance and capacitance of the M5Si95, respectively. $CPE_i$ is capacitance between electrodes and the interface of the M5Si95. By using this circuit model, a fitting was carried out to the impedance results of the M5Si95 film in a method of nonlinear least squares. The fitting results to Ce5Si95 film was shown in FIG. 4. In FIG. 4, a horizontal axis indicates real number component of impedance Z' (Ω)(when current and voltage have 0 phase difference), and the vertical axis indicates imaginary number component of impedance −iZ" (Ω)(when current and voltage have π/2 phase difference). Also, a solid line indicates calculated values and a circle indicates a measured value. All the measurement values were within 5% of minimum mean-square error estimation by using an equivalent circuit. The same experiment was carried out to the other M5Si95 films. Results showing a similar tendency were obtained. The results show that the M5Si95 films formed in the present example were all ion conductive films.

Figure 5:
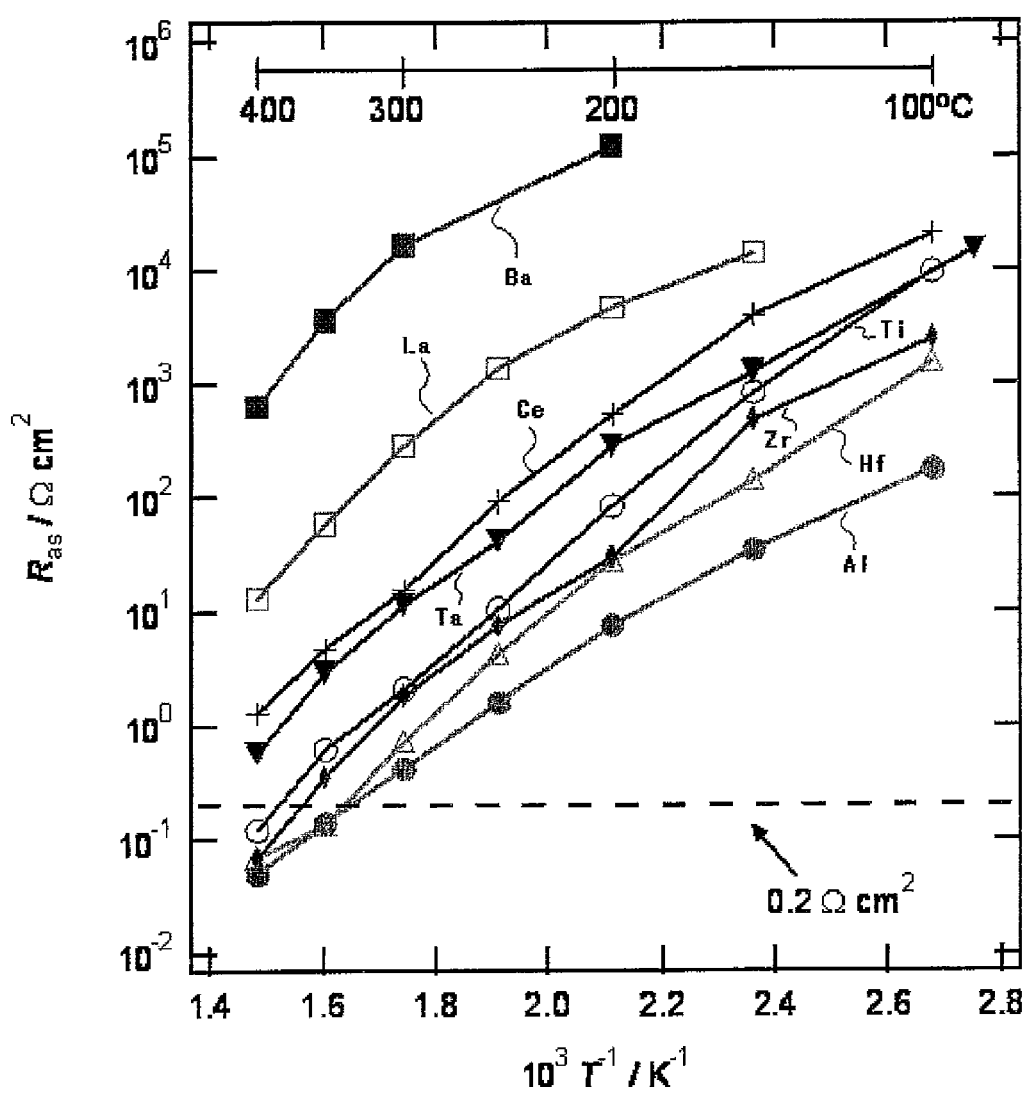
FIG. 5 shows an area specific resistivity of M5Si95 film measured in the impedance measurement in Example 1.

Accordingly, $R_{ox}$ is an ion conductive resistance of the M5Si95 film. An area specific resistivity $R_{as}$ (Ωcm²) was calculated by multiplying $R_{ox}$ by an electrode area (0.00785 cm²). FIG. 5 shows that each of the M5Si95 films was plotted by $R_{as}$ with respect to reciprocal temperature (1000/T) (K). In FIG. 5, a black square indicates Ba5Si95; a white square indicates La5Si95; a plus mark indicates Ce5Si95; a black triangle indicates Ta5Si95; a black circle indicates Al5Si95; a white circle indicates Ti5Si95; a black diamond indicates Zr5Si95; and a white triangle indicates Hf5Si95. As is clear from FIG. 5, the area specific resistivity $R_{as}$ of each of the M5Si95 films clearly showed temperature dependency and increase of temperature lowered the area specific resistivity $R_{as}$ exponentially. In particular, Hf5Si95, Al5Si95, Zr5Si95, and Ti5Si95 showed high ion conductivity and $R_{as}$ declined to 0.2 Ωcm² at about 400° C. From the above, it was confirmed that M5Si95 is an ion conductor.

Table 2 shows a film thickness of each of the formed M5Si95 films.

TABLE 2

| | Film thickness (nm) |
|---|---|
| Ce | 55 |
| Al | 57 |
| Ti | 68 |
| Zr | 68 |
| Ba | 66 |
| La | 52 |
| Hf | 79 |
| Ta | 73 |

Further, ion conductivity of each of the formed thin films at 400° C. was calculated. Table 3 shows the results.

TABLE 3

| | Ion Conductivity (S cm$^{-1}$) |
|---|---|
| Ce5Si95 | $4.3 \times 10^{-6}$ |
| Al5Si95 | $1.2 \times 10^{-4}$ |
| Ti5Si95 | $5.7 \times 10^{-5}$ |
| Zr5Si95 | $1.0 \times 10^{-4}$ |
| Ba5Si95 | $4.0 \times 10^{-8}$ |
| La5Si95 | $1.0 \times 10^{-7}$ |
| Hf5Si95 | $1.1 \times 10^{-4}$ |
| Ta5Si95 | $1.3 \times 10^{-5}$ |

Compositions of each of the M5Si95 thin films were determined by the XPS analysis (electron spectroscopy for chemical analysis). The following table shows the results. M/Si ratio of precursor solution (5/95) is larger than M/Si ratio of thin film in every case. This is because the metal alkoxide $M(OR)_n$ shows larger activity in response to hydrolysis than TEOS.

TABLE 4

| Metal Composition in precursor solution | Film Composition |
|---|---|
| Ce5Si95 | $Ce_{0.13}Si_{0.87}O_2$ |
| La5Si95 | $La_{0.18}Si_{0.82}O_2$ |
| Y5Si95 | $Y_{0.13}Si_{0.87}O_2$ |
| Hf5Si95 | $Hf_{0.16}Si_{0.84}O_2$ |

Figure 6:
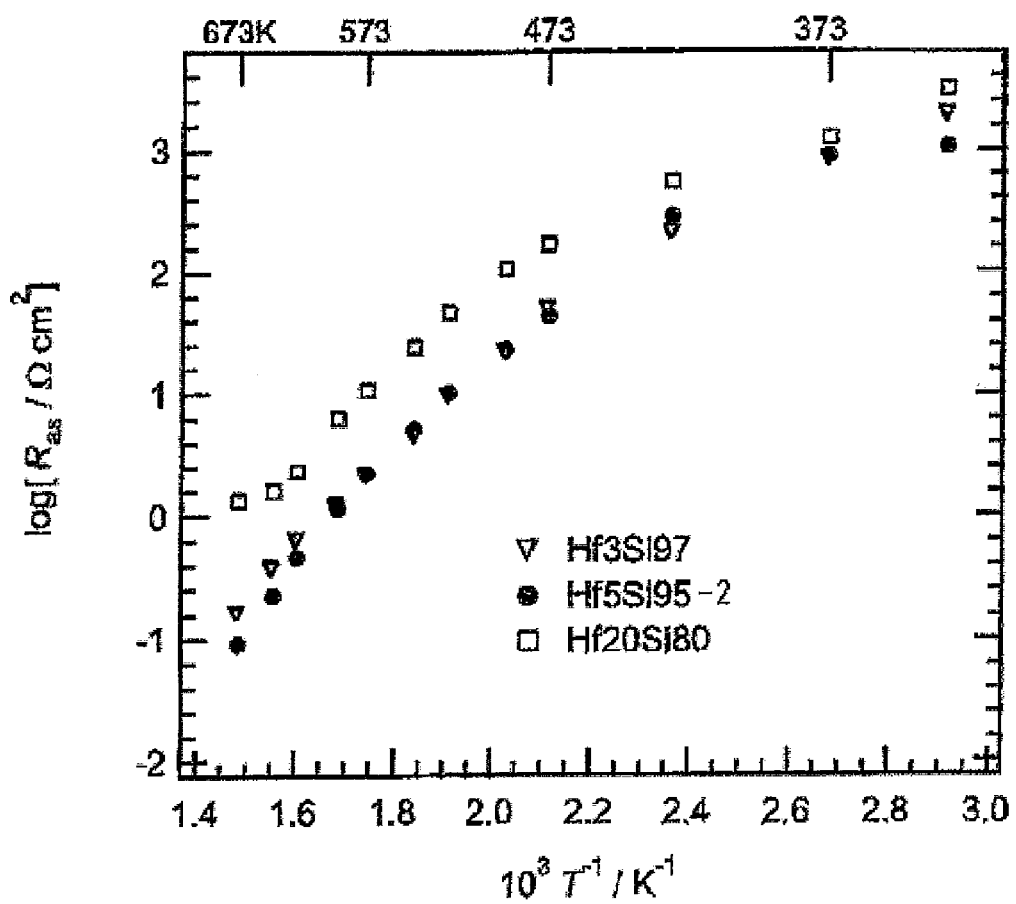
FIG. 6 shows area specific resistivities of Hf3Si97 film, Hf5Si95-2 film, and Hf20Ssi80 film measured in the impedance measurement in Example 1.

Further, in the same manner as the above, Hf3Si97 film, Hf5Si95-2 film, and Hf20Ssi80 film were formed in which atomic ratios in precursor solution were Hf/Si=3/97, Hf/Si=5/95, Hf/Si=20/80 respectively, and 62 nm, 65 nm, 75 nm in thickness respectively. An area specific resistivity of each film in the air was measured. FIG. 6 shows the results. In FIG. 6, the vertical axis indicates an area specific resistivity $R_{as}$ in log $R_{as}$ and the horizontal axis indicates reciprocal temperature (K). Also, in FIG. 6, a white triangle indicates the Hf3Si97 film; a black circle indicates the Hf5Si95-2 film; and a white square indicates the Hf20Ssi80 film. The Hf3Si97 film and the Hf5Si95-2 film showed substantially equal area specific resistivity within a measurement temperature range. Also, the Hf20Si80 film showed one digit greater area specific resistivity at 200° C. A film composition and film thickness of the Hf3Si97, Hf5Si95-2, and Hf20Si80 were measured in the same manner as the above. The following table shows the results.

TABLE 5

| Metal Composition in precursor solution | Film Composition | Film Thickness (nm) |
| --- | --- | --- |
| Hf3Si97 | $Hf_{0.14}Si_{0.86}O_2$ | 62 |
| Hf5Si95-2 | $Hf_{0.16}Si_{0.84}O_2$ | 65 |
| Hf2OSi80 | $Hf_{0.36}Si_{0.65}O_2$ | 75 |

Further, an ion conductivity of each of the thin films at 400° C. was calculated. The following table shows the results.

TABLE 6

| | Ion conductivity (S cm$^{-1}$) |
| --- | --- |
| Hf3Si97 | $4.1 \times 10^{-5}$ |
| Hf5Si95-2 | $7.6 \times 10^{-5}$ |
| Hf20Si80 | $5.4 \times 10^{-6}$ |

Example 2

Figure 7:
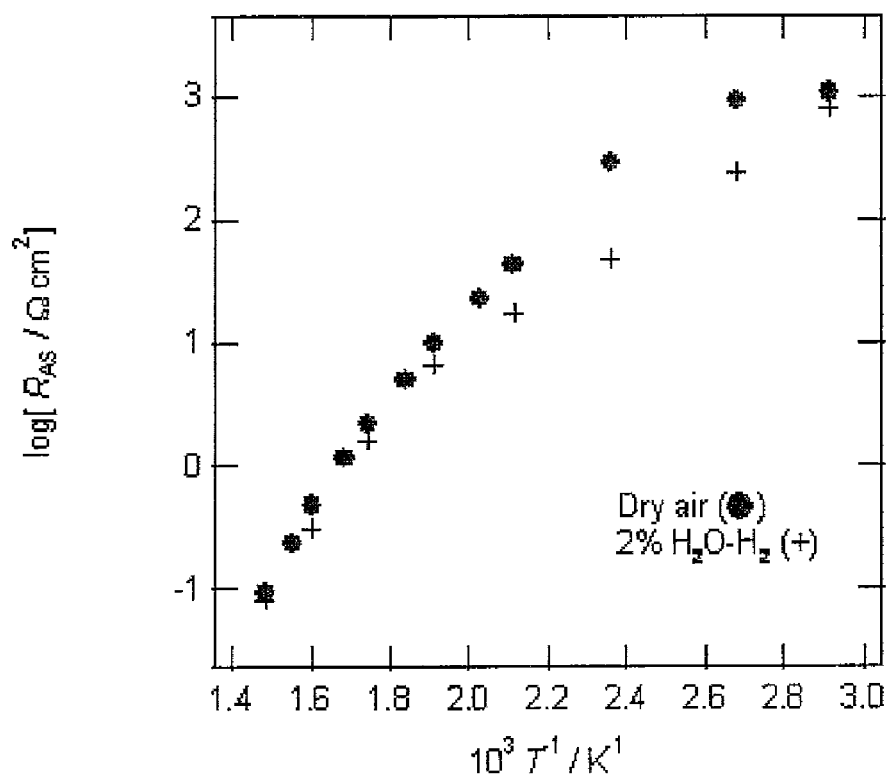
FIG. 7 shows an area specific resistivity of Hf5Si95 film measured in Example 2.

As for the Hf5Si95 film formed in Example 1, an impedance was determined in dry air and in $H_2/N_2$ mixed gas with 2% water ($H_2O/H_2/N_2=2/10/90$), and then each area specific resisitivity was calculated. FIG. 7 shows the results. In FIG. 7, a black circle indicates a measurement result in dry air; and a plus mark indicates a measurement result in the damp air 2% water included. The Hf5Si95 film showed about one digit smaller area specific resistivity in damp air than that in dry air at 200° C. or less. At 250° C. or more, there is no difference in area specific resistivity in oxidation or reduction and in dry air or damp air. According to this result, at least at 250° C. or more, ion conductivity of the Hf5Si95 film is not proton conductivity due to the addition of moisture and hydrogen.
[Production of Oxygen Concentration Cell and Electro Motive Force Measurement]

Figure 8:
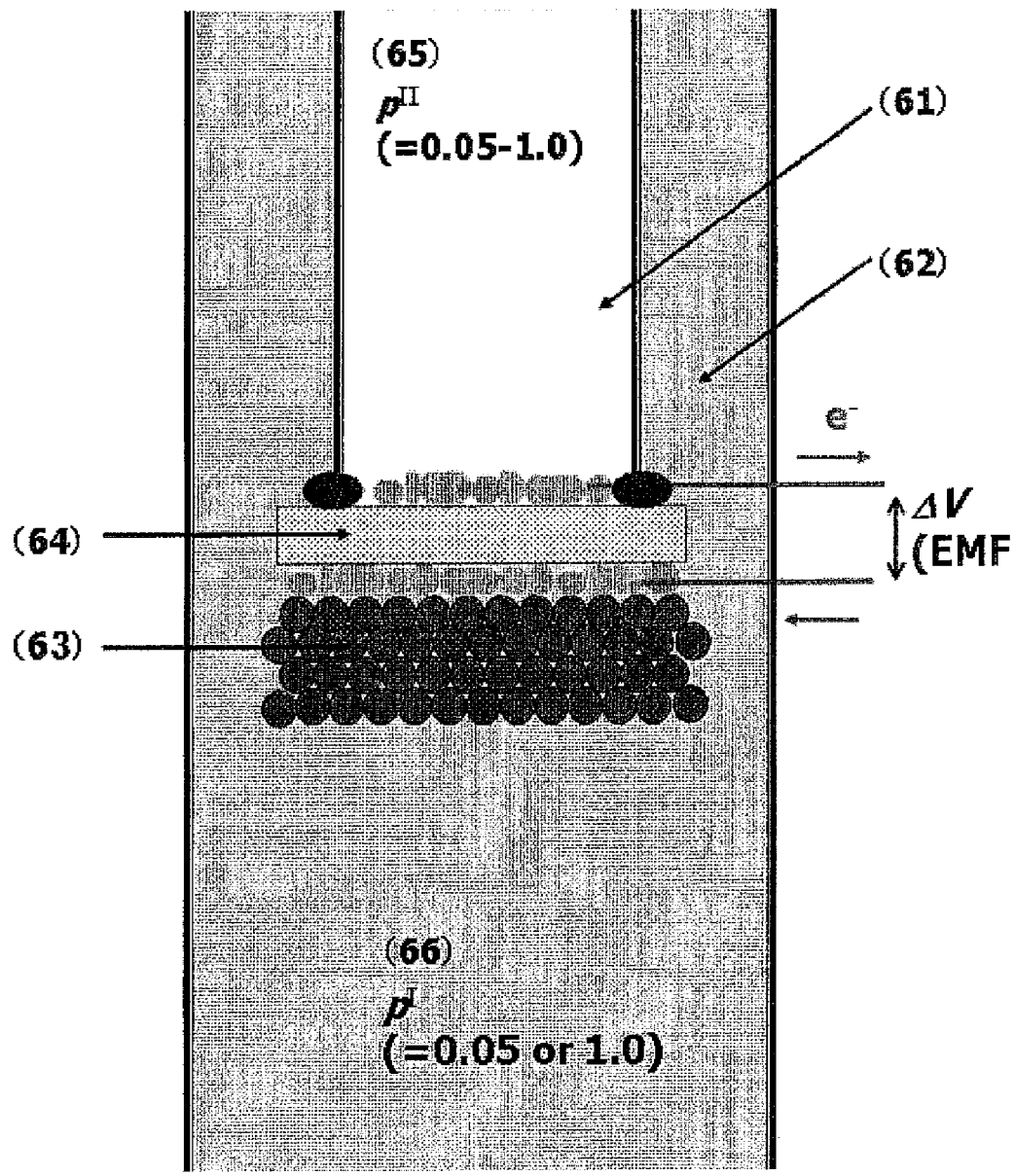
FIG. 8 is a schematic view of an oxygen concentration cell with use of the Hf5Si95 film in Example 2.

In order to check whether a conductive ion of the M5Si95 film had both oxide ion conductivity and/or proton conductivity, electro motive force (EMF) of an oxygen concentration cell was measured, which oxygen concentration cell included a self-supporting thin film formed on the porous electrode. FIG. 8 shows a structure of the oxygen concentration cell. The concentration cell has two gas chambers (61 and 62) separated by the M5Si95 film (64). The M5Si95 film (64) is provided on the porous substrate (63) and two electrodes are provided on both sides of the M5Si95 film (64). In the gas chamber (61), $O_2/N_2$ or $H_2/N_2$ mixture gas (65) flows under various partial pressures. In another gas chamber (62), $O_2/N_2$ or $H_2/N_2$ mixture gas (66) flows under a fixed partial pressure 0.05 or 1.0. Between the both gas chambers (61) and (62), a chemical potential gradient is generated due to the concentration difference. Therefore, an oxygen molecule is converted to an oxide ion and migrates from a high concentration side to a low concentration side in the M5Si95 film (64). At the same time, an electron migrates from the low concentration side to the high concentration side. As a result, electro motive force (EMF) is generated and a magnitude is determined by the following Nernst formula.

$$EMF = -kT/2ne \ln(p^{II}/p^{I})$$

Figure 9:
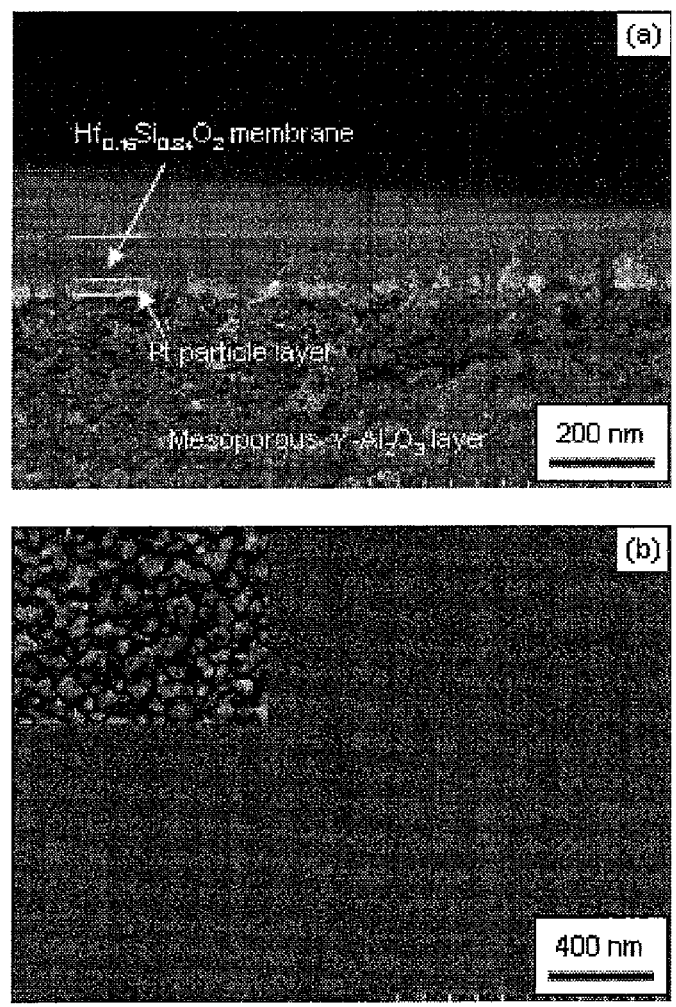
FIG. 9 is scanning electronic microscopic pictures of a surface and a cross-section of the Hf5Si95 film which was created on a gas diffusion electrode in Example 2.

In this formula, $P^I$ and $P^{II}$ are respectively oxygen partial pressure and hydrogen partial pressure of the mixture gas (66) and (65); n is a valence number of mobile ion; and e is elementary charge. Namely, the electro motive force is calculated by a temperature and a partial pressure difference. In a case where a measured EMF equals to a calculated EMF, it is confirmed that the M5Si95 film is a pure acid proton conductor or a pure oxide ion conductor. The gas concentration cell was created by forming the Hf5Si95 film on a Pt/Al$_2$O$_3$ gas diffusion electrode. By using a method reported in J. Mater. Sci. 27:527-537 (1992), a porous alumina support was formed. One side of a disc-shaped porous α-Al$_2$O$_3$ sintered object (made by Noritake Company, 2 mm in diameter, 0.1 mm in thickness) was dip coated with 1M boehmite precursor solution. After dried-out, the resultant object was calcinated at 600° C. for 3 hours and thereby a mesoporous γ-Al$_2$O$_3$ layer (10 μm in thickness) was formed. On this mesoporous γ-Al$_2$O$_3$ layer, Pt particle layer was deposited by sputtering and was calcinated at 600° C. for 1 hour. As a result, a Pt/Al$_2$O$_3$ gas diffusion electrode was obtained. The Pt/Al$_2$O$_3$ gas diffusion electrode thus obtained was (i) immersed in 0.01 mol/dm$^3$ mercaptoethan sulfone sodium/methanol for 12 hours, (ii) was rinsed with methanol, and (iii) was dried under reduced pressure. Further, on the surface of the dried electrode substrate, 100 μl of 5 mg/ml polydiallyldimethylammonium chloride (PDDA) solution was dropped, and was spin coated for 10 seconds at 3000 rpm. After washing the surface of the dried electrode substrate with spin coating of pure water, 100 μl of 5 mg/ml polyacrylc acid (PAA) was dropped on the surface of the substrate and was spin coated for 10 seconds at 3000 rpm. Then the surface was spin coated with pure water. This series of operation related to PDDA solution and PAA solution spin coating was repeated several times. The Hf5Si95 film was formed in the same manner as Example 1. FIG. 9(a) shows a SEM picture of a cross-section of the Hf5Si95 film. FIG. 9(b) shows a SEM picture of a surface of the Hf5Si95 film. The porous alumina support of the gas diffusion electrode forms the γ-Al$_2$O$_3$ layer having a thickness of 8 μm uniformly on macro porous α-Al$_2$O$_3$ sintered object. The Pt electrode includes several tens nm particles having 10 to 40 nm gap therebetween. The Hf5Si95 film was confirmed to be a film having an even thickness of 110 nm without any voids and cracks which completely covered the surface of the Pt/Al$_2$O$_3$ gas diffusion electrode. Next, a porous electrode (80 nm, 2 mm diameter) was deposited on the Hf5Si95 film by sputtering, and then was put in a quartz glass tube, which was then sealed at one end with an alumina cement (TOAGOSEI CO., LTD). Thus, an oxygen concentration cell as illustrated in FIG. 8 was created. To both chambers, gas adjusted by partial pressure was supplied at 200 ml/min after removing water by a cold trap. Electro motive force (EMF) was measured by using a digital multimeter (E2221 made by Advantest Corporation).

Figure 10:
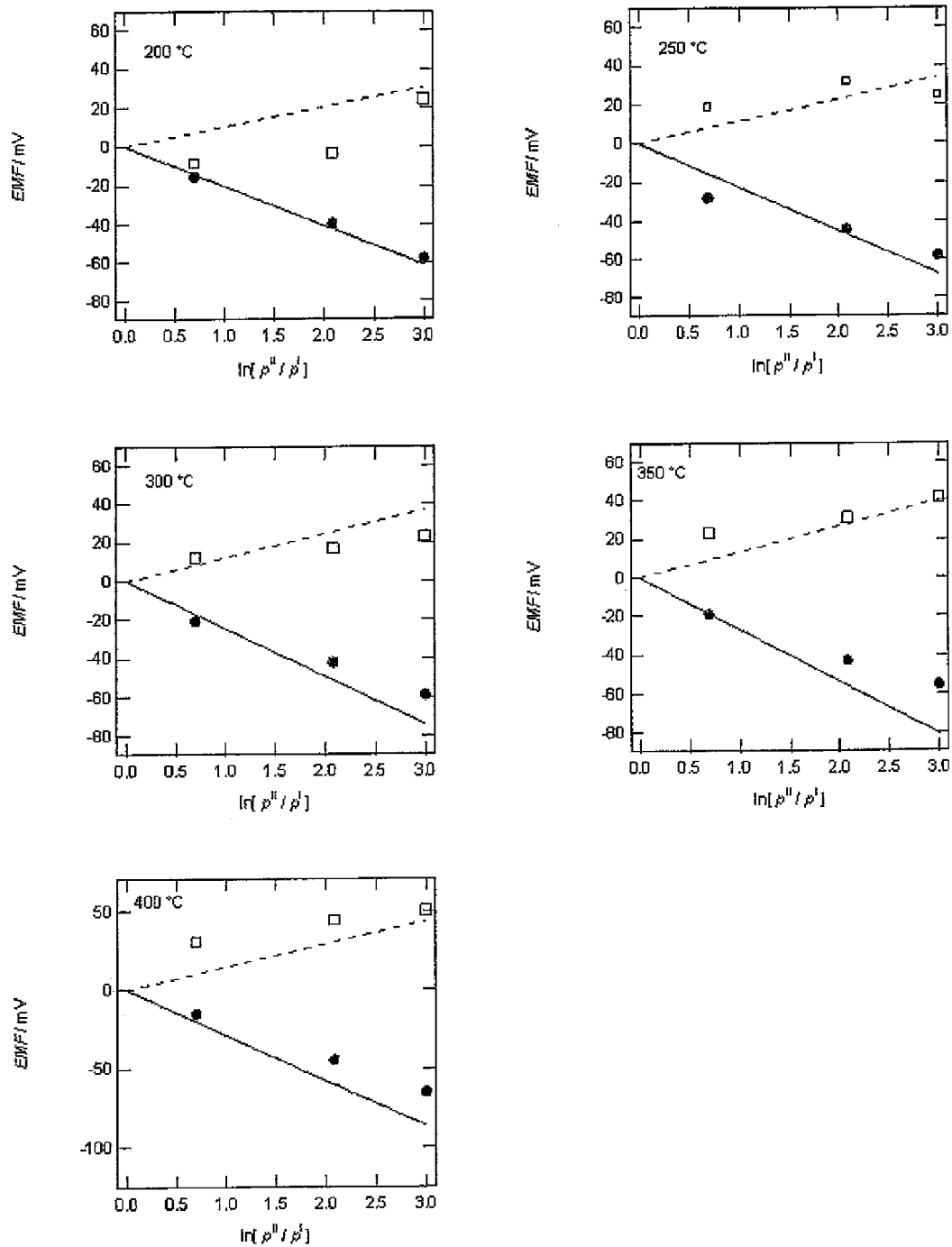
FIG. 10 shows electro motive forces and theoretical values of the Hf5Si95 film at 200° C., 250° C., 300° C., 350° C., and 400° C. in Example 2.

The electro motive force (EMF unit:mV) at 200° C., 250° C., 300° C., 350° C., and 400° C. were measured. FIG. 10 shows the results. In FIG. 10, a solid line indicates a theoretical figure of a hydrogen concentration cell; a broken line indicates a theoretical figure of an oxygen concentration cell; a black circle indicates a measurement value of a hydrogen concentration cell; and a white square indicates a measurement value of an oxygen concentration cell. The horizontal axis of FIG. 10 indicates In ($P^H/P^I$). Within a temperature range from 200° C. to 300° C., the hydrogen concentration cell showed a value of electro motive force which was close to the theoretical figure. At a temperature 350° C. or higher, a gap between a measurement value and a theoretical figure increased. On the other hand, the oxygen concentration cell showed no concentration dependence of electro motive force at a low temperature. It was confirmed that temperatures of 300° C. or higher, contributed to the increase of the oxide ion conductivity.

Figure 11:
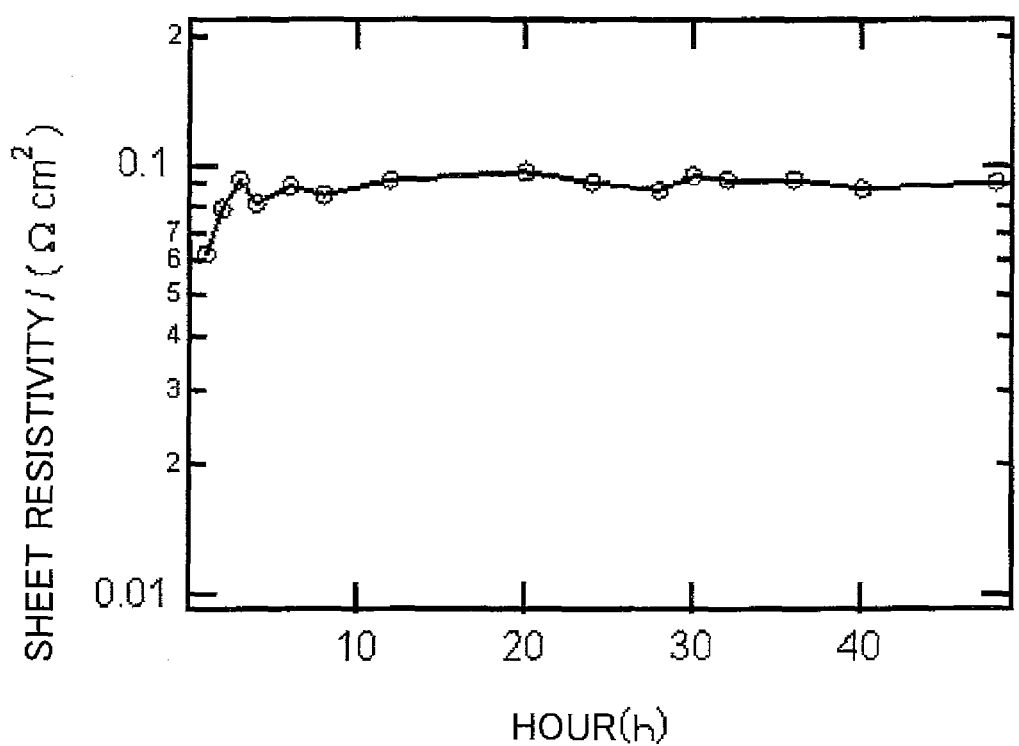
FIG. 11 shows change of an area specific resistivity of the Hf5Si95 film, which, as measured in Example 2, was heated at 400° C. for 48 hours in dry air.

Next, change of an area specific resistivity of the Hf5Si95 film was measured when the film was heated at 400° C. for 0 to 48 hours in dry air. FIG. 11 shows the results. In FIG. 11, a vertical axis shows an area specific resistivity R and a horizontal axis shows a heating period. The proton conductivity was very stable even in dry air and it was confirmed that its resistive value did not change at all even in 48 hours. As a result, it is clear that the proton conductivity of the present invention is different from proton conduction mechanisms of a conventional proton conductive ceramic and a proton conductive body of a xerogel compound. Conventionally known proton conduction is due to adsorbed water in a porous structure and proton lattice defect caused by a reaction between water molecule and an oxygen lattice defect. Therefore, the proton conductivity is lost at high temperature in dry air. Namely, a conventional proton conductive structure loses the proton conductivity at high temperature in dry air. Therefore, it is possible to obtain an inorganic material showing proton conductivity generated by a structure different from a conventional structure by using a material of the present invention.

Example 3

A conductive material with use of amorphousaluminosilicate was made by the following method.
[Preparation of ITO Substrate]
A preparation of ITO substrate was carried out in the same manner as Example 1.
[Al/Si=0/100 Precursor Solution Preparation]
1-propanol (10 ml) was added to TEOS (5.2 g) measured in a sample bottle and stirred for 30 minutes at room temperature. 0.004M hydrochloric acid (0.45 ml) was slowly added to the mixture and was stirred for one hour in a 60° C. water bath. Then 0.06M hydrochloric acid (2.0 ml) was slowly added to the mixture and was mixed for one hour in a 70° C. water bath. After filtration with use of 0.2 μm filter, 1-propanol was added to the resultant to dilute to 100 mM. As a result, Al/Si=0/100 precursor solution was obtained.
[Al/Si=5/95, 10/90, 20/80, 50/50, 90/10 Precursor Solution Preparation]
1-propanol and 0.1 M hydrochloric acid were added to TEOS measured in a sample bottle and mixed for 30 minutes at room temperature (TEOS density:HCl density=280:1 [mol]). Aluminumbutoxoid was further added to the mixture and was stirred for 1 hour at 70° C. on a hot plate. After filtration with use of 0.2 μm filter, 1-propanol was added to the resultant so that metal concentration (Si+Al) was diluted to 100 mM. As a result, Al/Si=5/95, 10/90, 20/80, 50/50, 90/10 precursor solutions were obtained respectively.
[Al/Si=100/0 Solution Preparation]
1-propanol was added to aluminumbutoxide measured in a sample bottle and was mixed for 1 hour at 70° C. on a hot plate. After filtration with use of 0.2 μm filter, 1-propanol was added to the resultant so as to dilute to 50 mM. As a result Al/Si=100/0 solution was obtained.

With use of Al/Si=0/100, 5/95, 10/90, 20/80, and 100/0 precursor solutions thus obtained, a Si100 film, Al5Si95-2 film, Al10Si90 film, Al20Si80 film, and Al100 film were formed respectively by the following procedure. 200 μl of each precursor solution was spin coated at 3000 rpm for 20 to 40 seconds. Each surface was washed and cooled with $N_2$ gas and was heated in a muffle kiln at 300° C. for 3 minutes. This procedure was repeated 10 to 15 times until a film thickness is 100 nm. The film thickness was measured by using a scanning electronic microscope (SEM) and the metal composition was assessed by a method of photoelectron spectroscopy (XPS). Table 7 shows the compositions.
[Measurement of Area Specific Resistivity]
In the same manner as Example 1, an area specific resistivity of each film was measured. Each of the measurements was carried out inside an airtight tubular electrical furnace in dry air and in 2% damp air, at 50° C., 80° C., 100° C., 150° C., 200° C., 250° C., 300° C., 350° C., and 400° C. The damp air containing 2% water was made by bubbling dry air in 25° C. pure water. The following table shows area specific resistivity of each film at 80° C. in dry air.

TABLE 7

| Sample | Metal Composition In thin film (Al/Si) | Area Specific Resistivity (80° C.)/Ωcm² |
|---|---|---|
| Si100 | 0/1.00 | $1.2 \times 10^5$ |
| Al5Si95 | 0.14/0.86 | $6.4 \times 10^3$ |
| Al10Si90 | 0.18/0.82 | $7.5 \times 10^2$ |
| Al20Si80 | 0.45/0.55 | $1.3 \times 10^3$ |
| Al100 | 0/1.00 | $>10^6$ |

Figure 12:
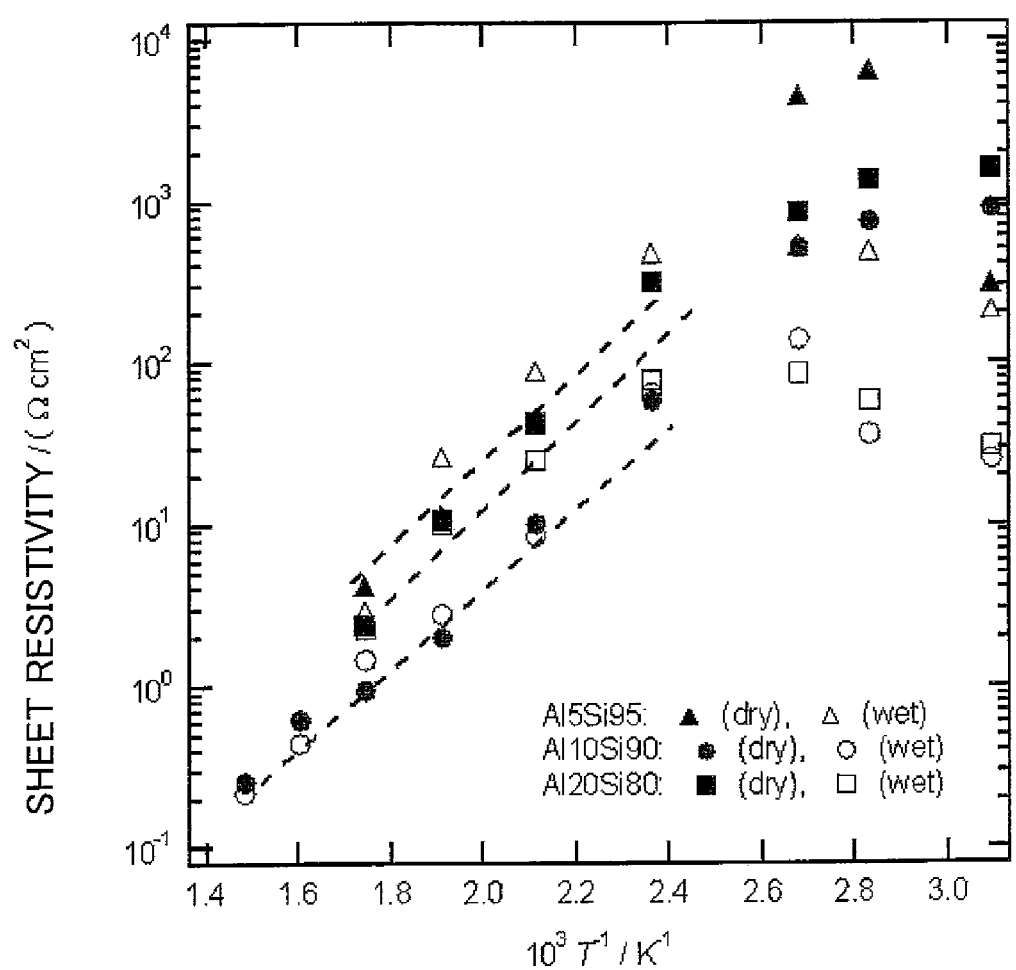
FIG. 12 shows an area specific resistivity of the Al5Si95 film, Al10Si90 film, and Al20Si80 film whose impedances were measured in Example 3.

A thin film with high aluminum concentration (Al100 film) was an insulator in dry air. A thin film with relatively low aluminum concentration showed ion conductivity. Compared to the Si100 film, Al5Si95 film, Al10Si90 film, and Al20Si80 film showed high ion conductivity. FIG. 12 shows that an area specific resistivity of the Al5Si90 film, the Al10Si90 film, and the Al20Si80 film with respect to temperature change. In FIG. 12, a triangle, a square, and a circle indicate the Al5Si90 film, the Al10Si90 film, and the Al20Si80 film, respectively. Among them black marks indicate an area specific resistivity measured in dry air, and white marks indicate an area specific resistivity measured in 2% damp air. Note that a vertical axis shows an area specific resistivity $R_{as}$ and a horizontal axis shows reciprocal number of temperature $(K) \times 10^3$. The larger a value of the horizontal axis, the lower a temperature. At 150° C. or lower, every thin film showed that an area specific resistivity in damp air was smaller than that in dry air by 1 to 2 digits. It seems that ion conductivity of a thin film was increased because of proton conductivity caused by adsorbed water at 150° C. or lower. At 200° C. or more, each of the films showed the same area specific resistivity both in dry air and in damp air. Among them, the Al10Si90 film showed the smallest area specific resistivity i.e., 0.24 Ωcm² at 400° C. This value is essentially equivalent to a required area specific resisitivity as an electrolyte film for a fuel cell, i.e., 0.2 Ωcm².

Figure 13:
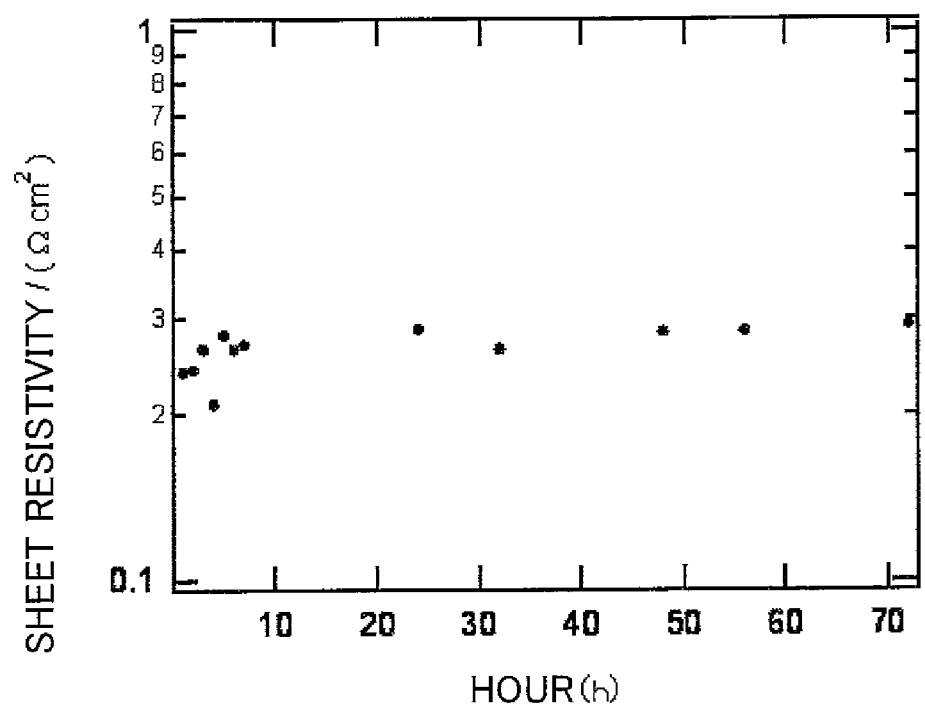
FIG. 13 shows an area specific resistivity of the Al10Si90 film, which, as measured in Example 3, was heated at 400° C. for 72 hours in dry air.

FIG. 13 shows that an area specific resistivity of the Al10Si90 film which was held in dry air (100 ml/min) at 400° C. for 72 hours. In FIG. 13, a vertical axis shows an area specific resistivity $R_{as}$ and a horizontal axis shows an hour. Proton conductivity of the Al10Si90 film was stable even in dry air condition and its resistance value did not change in 72 hours. This characteristic shows that the proton conductivity of the present invention is different from proton conduction mechanisms of a conventional proton conductive ceramic and a proton conductive body of a xerogel compound. A conventional proton conductivity is due to adsorbed water in a porous structure or proton lattice defect caused by a reaction between water molecule and an oxygen lattice defect. Therefore, the proton conductivity is lost at high temperature in dry air. Thus, a conductive film of the present invention is an innovative electrolyte film material which shows high proton conductivity at 400° C. in dry air.

Ion conductivity of the Al5Si95 film and Al20Si80 film at 300° C. and ion conductivity of the Al10Si95 film at 400° C. were calculated. The following table shows the results.

TABLE 8

| Sample | Ion Conductivitiy (Scm$^{-1}$) | Temperature (° C.) |
|---|---|---|
| Al5Si95 | $3.5 \times 10^{-6}$ | 300 |
| Al0Si90 | $4.2 \times 10^{-5}$ | 400 |
| A20Si80 | $4.5 \times 10^{-6}$ | 300 |

Example 4

An aluminosilicate thin film was formed by using methyltriethoxysilane as a silica precursor. A silicon substrate as a base was washed by using piranha solution. 20 mol % of vinyl ether compound is added to polyhydroxystyrene (PHS). Then 100 μl of the resultant was dropped and was spin coated on the silicon wafer (3000 rpm, for 60 seconds). As a result, a sacrificial film was formed on the silicon substrate. On the sacrificial film, 5 mg/ml polyvinyl alcohol solution was spin coated at 3000 rpm for 60 seconds.
[Al/Si=10/90 Precursor Solution Preparation]

Figure 14:
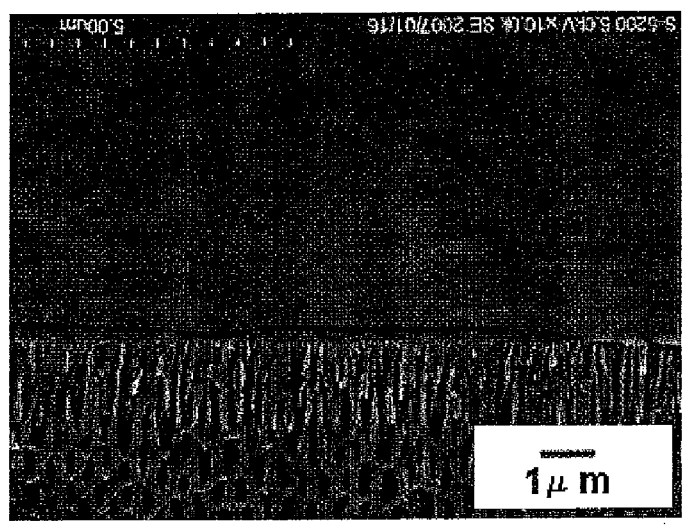
FIG. 14 is a scanning electronic microscope picture of cross-section of the Al10Si90 film formed in Example 4.
Figure 14:
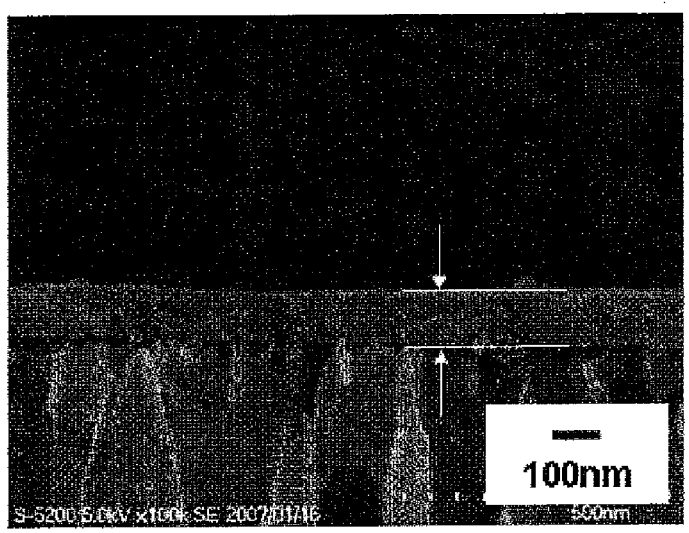
Figure 15:
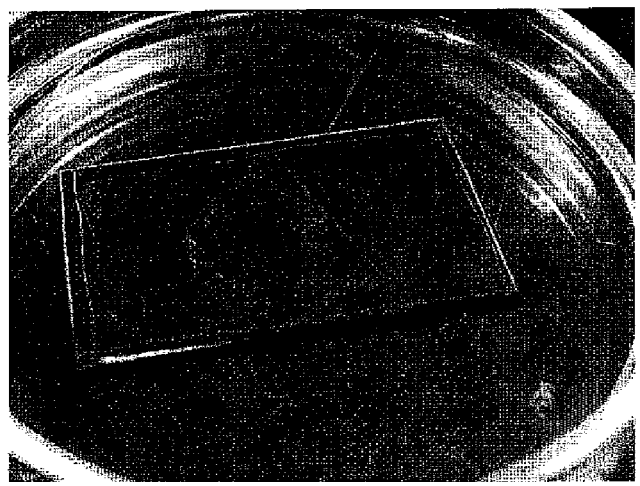
FIG. 15 is a picture of the Al10Si90 film, which was formed in Example 4, taken by a digital camera.

10 ml of 1-propanol was added to 0.17 g of TEOS and 0.016 g of MTES which were measured in a sample bottle and were stirred for 30 minutes at room temperature. Then 0.025 g of aluminum butoxide was further added to the mixture and was stirred for 1 hour at 70° C. on a hot plate. After filtration with use of 0.2 μm filter, a solution of 100 mM metal concentration (Si+Al) was obtained. 100 μl of the precursor solution of Al/Si=10/90 was spin-coated on the polyvinyl alcohol layer for 60 seconds and was left in air for 1 hour for hydrolytic cleavage. This procedure was repeated 10 to 15 times until the film thickness becomes 100 nm. Further, the substrate was immersed in p-toluenesulfonic acid ethanol solution to dissolve the sacrificial layer and transfer a remaining layer to a porous alumina substrate (Anodisc 25 made by Whatman plc). A form of the transferred self-supporting thin film on the anodic oxidized porous alumina substrate was assessed by using a scanning electronic microscope (SEM). FIG. 14 shows a SEM picture of a cross-section of the self-supporting Al10Si95 film. In FIG. 14, (a) and (b) are cross-sectional pictures of the film in different magnification ratios. The thin film formed in the present example had about 100 nm thickness including the polyvinyl alcohol layer. Further, the thin film has a macroscopic area size and its continuous film formation was maintained after the transfer. FIG. 15 is a picture of the self-supporting Al10Si90 film, which was isolated from the substrate in the p-toluenesulfonic acid ethanol solution, was folded by using a forceps, and was taken by a digital camera. The film did not tear off even though it was folded and proved that the self-supporting thin film has high flexibility and strength. Therefore, it was confirmed that the Al10Si90 film which had a self-supporting character and proton conductivity was able to be obtained.

Example 5

Zirconia-Ceria Thin Film Production

An ion conductive thin film in which zirconia (ZrO$_2$) or ceria (CeO$_2$) were in matrix was formed.

[ITO Substrate Preparation]
Firstly, an ITO substrate was preprocessed in the same manner as Example 1.
[Zr/Ce=90/10, Zr/Ce=50/50, Zr/Ce=10/90 Precursor Solution Preparation]

2-Ethoxy ethanol was added to zirconium butoxide (Zr(OC$_4$H$_9$)$_4$), which was measured in a sample bottle, and was stirred for 30 minutes at room temperature. An adequate dose of cerium methoxyethoxide (Ce(OC$_2$H$_5$OCH$_3$)$_4$) was added to the mixture and was stirred for 1 hour at 70° C. on a hot plate. After filtration with use of 0.2 μm filter, 2-ethoxyethanol was added to the resultant so that metal concentration (Zr+Ce) was diluted to 100 mM. As a result, solutions of Zr/Ce=90/10, 50/50, and 10/90 were obtained respectively.
[Thin Film Production]

Figure 16:
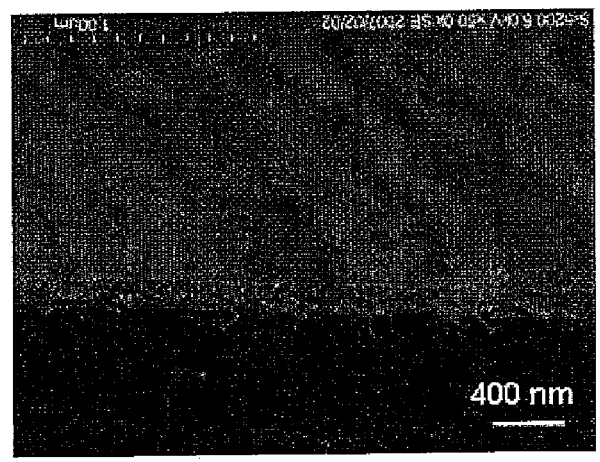
FIG. 16 is scanning electronic microscope pictures of a surface and a cross-section of Zr50Ce50 film created in Example 5.
Figure 16:
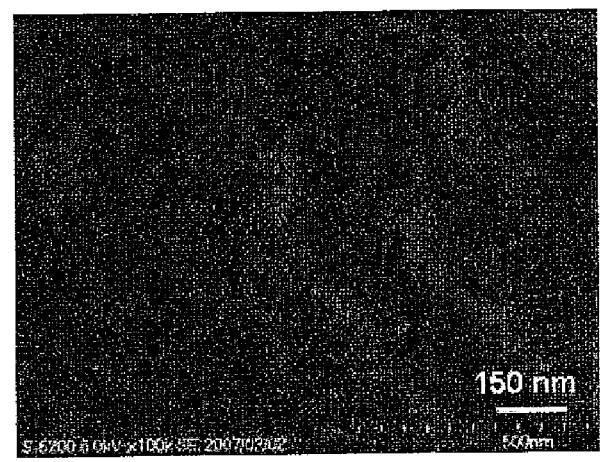

With use of precursor solutions of Zr/Ce=90/10, 50/50, and 10/90 thus obtained, a Zr90Ce90 film, Zr50Ce50 film, and Zr10Ce90 film were formed respectively by the following procedure. 200 μl of precursor solution was spin coated at 3000 rpm for 20 to 40 seconds and a surface was washed with N$_2$ gas. Then hydrolytic was carried out by heating with a heat gun for 20 seconds and surface washing and cooling was carried by blowing N$_2$ gas. This procedure was repeated about 20 times until the film becomes 100 nm thickness. The film thickness was measured by using a scanning electronic microscope (SEM). FIG. 16 shows SEM pictures of a surface and a cross-section of the Zr50Ce50 film. In FIG. 16, (a) shows the cross-section of the film and (b) shows the surface of the film. As is clear from FIG. 16, the thin film in 100 nm thickness was formed evenly on the ITO electrode, and the film was void- and crack-free and dense thin film.
[Measurement of Area Specific Resistivity]

Figure 17:
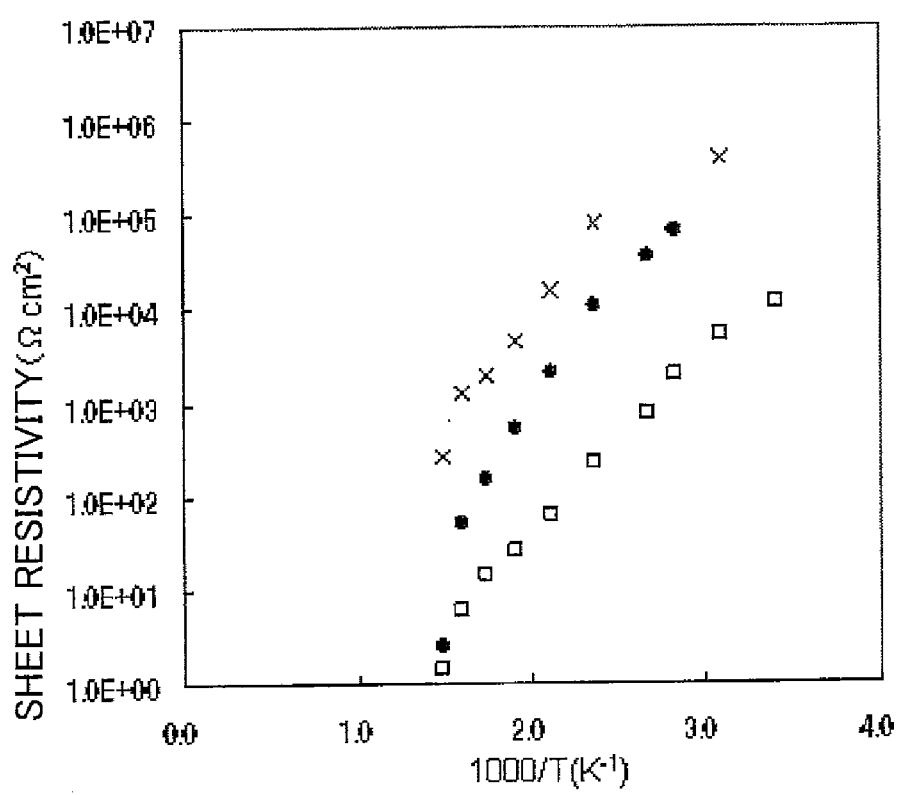
FIG. 17 shows an area specific resistivity of the Zr90Ce10 film, Zr50Ce50 film, and Zr10Ce90 film whose impedances were measured in Example 5.

An area specific resistivity was measured in the same manner as Example 1. All the measurements were carried out in an airtight quartz glass tube, in dry air, at 50° C., 80° C., 100° C., 150° C., 200° C., 250° C., 300° C., 350° C., and 400° C. FIG. 17 shows a change of the area specific resistivity of the Zr90Ce10 film, Zr50Ce50 film, and Zr10Ce90 film in dry air at each of the temperatures. FIG. 17 shows an area specific resistivity R$_{as}$ with respect to a reciprocal temperature (100/T) (K). In FIG. 17, an X mark indicates the Zr90Ce10 film, a white square indicates the Zr50Ce50 film; and a black circle indicates the Zr10Ce90 film. In every film, an area specific resistivity declined as the temperature increases exponentially. At 400° C. or less, the Zr50Ce50 film and the Zr10Ce90 film showed smaller area specific resistivitiy than that of the Zr90Ce10 film. Among them, the Zr50Ce50 film showed the smallest area specific resistivity, i.e., 1.4 Ωcm$^2$ at 400° C. This value is still larger than 0.2 Ωcm$^2$, an effective value for an electrolyte of fuel cell. By extrapolating to the plot of the measurement values, this thin film is expected to reach the effective value 0.2 Ωcm$^2$ at about 550° C. Therefore, the ion conductive film of the present invention is an electrolyte material which shows high ion conductivity at about 550° C. in dry air.

Ion conductivity at 400° C. of each of the thin films formed in the present embodiment was calculated. The following table shows the results.

TABLE 9

| | Ion Conductivity (Scm$^{-1}$) |
|---|---|
| Zr90Ce10 | $3.8 \times 10^{-8}$ |
| Zr50Ce50 | $7.1 \times 10^{-6}$ |
| Zr10Ce90 | $3.8 \times 10^{-6}$ |

INDUSTRIAL APPLICABILITY

The present invention allows providing a conductive material which is workable at wide temperature range and is capable of producing an ion conductive film having low area specific resistivity. In particular, a conventional ion conductive film only works at 500° C. or more, in contrast, the ion conductive film of the present invention is workable also at less than 500° C., particularly at 400° C. or less. In addition, the film is workable in high temperature range, i.e., at 600° C. or more. Further, the ion conductive film of the present invention is able to form at low cost and is able to avoid a problem of performance degradation caused by a reaction with other constituent materials for fuel cell. In addition, in the present invention, the film is capable of possessing both characteristics of oxide ion conductivity and proton conductivity.

Therefore, the present invention is expected to provide low-temperature workability to solid electrochemistry devices such as a solid oxide fuel cell (SOFC), an oxygen separation film, a hydrogen separation film, membrane reactor, and the like. Moreover, in the future, there is a possibility to make a fuel cell working at room temperature.

The invention claimed is:

1. An ion conductive material made of an amorphous material having a metal silicate skeleton, the ion conductive material having an oxide ion conductivity and/or proton conductivity and the amorphous material being an amorphous material prepared by doping $SiO_2$ with a cation, and the cation having a coordination number 5 or more, and being different from a metallic ion that the metallic oxide has, the ion conductive material having a film shape, and the ion conductive material having $5 \times 10^{-5}$ S·cm$^{-1}$ or more ion conductivity at an operation temperature of 400° C.

2. The ion conductive material as set forth in claim 1, wherein: the cation is a cation with a coordination number 6 or more.

3. The ion conductive material as set forth in claim 1, wherein: the cation is a metal ion.

4. The ion conductive material as set forth in claim 1, wherein: the cation is at least one member selected from the group consisting of rare-earth metal ions, Al ion, Zr ion, Nb ion, Hf ion, Ta ion, and first transition metal ions.

5. The ion conductive material as set forth in claim 1, wherein: the cation is at least one member selected from the group consisting of Ce ion, Al ion, Ti ion, Zr ion, Nb ion, Y ion, La ion, Hf ion, and Ta ion.

6. The ion conductive material as set forth in claim 1, wherein: the film is in a range of 0.005 μm to 1.0 μm in thickness.

7. The ion conductive material as set forth in claim 1, having 0.2 Ωcm$^2$ or less area specific resistivity at operation temperature 0° C. through 800° C.

8. The ion conductive material as set forth in claim 1, wherein: the ion conductivity is proton conductivity.

9. The ion conductive material as set forth in claim 1, wherein: the ion conductivity is oxide ion conductivity.

10. The ion conductive material as set forth in claim 1, wherein: the ion conductivity is mixed conductivity of proton conductivity and oxide ion conductivity.

11. A conductive film for a fuel cell including an ion conductive material as set forth in claim 1.

12. A membrane electrode assembly including an ion conductive material as set forth in claim 1.

13. A fuel cell including a membrane electrode assembly that includes an ion conductive material made of an amorphous material, the ion conductive material having an oxide ion conductivity and/or proton conductivity and the amorphous material being an amorphous material prepared by doping $SiO_2$ with a cation, and the cation having a coordination number 5 or more, and being different from a metallic ion that the metallic oxide has, the ion conductive material having a film shape, and the ion conductive material having $5 \times 10^{-5}$ S·cm$^{-1}$ or more ion conductivity at an operation temperature of 400° C.

* * * * *